United States Patent
Banister et al.

(10) Patent No.: US 9,357,416 B2
(45) Date of Patent: May 31, 2016

(54) OPTIMIZING UE WAKEUP TIMELINE IN CONNECTED MODE DRX BASED ON CQI REPORTING SCHEDULE IN A WIRELESS COMMUNICATION SYSTEM

(75) Inventors: Brian Clarke Banister, San Diego, CA (US); Hisham A. Mahmoud, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 382 days.

(21) Appl. No.: 13/620,507

(22) Filed: Sep. 14, 2012

(65) Prior Publication Data

US 2013/0194990 A1    Aug. 1, 2013

Related U.S. Application Data

(60) Provisional application No. 61/592,526, filed on Jan. 30, 2012.

(51) Int. Cl.
| | |
|---|---|
| *H04L 12/26* | (2006.01) |
| *H04W 24/10* | (2009.01) |
| *H04W 52/02* | (2009.01) |
| *H04W 76/04* | (2009.01) |

(52) U.S. Cl.
CPC .......... *H04W 24/10* (2013.01); *H04W 52/0216* (2013.01); *H04W 76/048* (2013.01); *Y02B 60/50* (2013.01)

(58) Field of Classification Search
USPC .................. 370/236, 241, 252, 311, 328, 329
See application file for complete search history.

(56) References Cited

U.S. PATENT DOCUMENTS

| | | | |
|---|---|---|---|
| 8,121,045 B2 | 2/2012 | Cai et al. | |
| 2007/0287468 A1* | 12/2007 | Jeong et al. | 455/452.2 |
| 2008/0026744 A1 | 1/2008 | Frederiksen et al. | |
| 2008/0165698 A1* | 7/2008 | Dalsgaard | H04W 24/10 370/252 |
| 2008/0285509 A1* | 11/2008 | Womack et al. | 370/329 |
| 2009/0163199 A1* | 6/2009 | Kazmi et al. | 455/425 |
| 2009/0168718 A1 | 7/2009 | Wang et al. | |
| 2009/0232118 A1* | 9/2009 | Wang et al. | 370/338 |
| 2009/0296850 A1* | 12/2009 | Xu et al. | 375/295 |
| 2010/0014429 A1 | 1/2010 | Kim et al. | |
| 2010/0113057 A1* | 5/2010 | Englund et al. | 455/452.1 |
| 2010/0197316 A1 | 8/2010 | Aoyama et al. | |
| 2011/0038277 A1* | 2/2011 | Hu et al. | 370/252 |

(Continued)

OTHER PUBLICATIONS

3GPP ETSI TS 136 213 v8.6.0 (Apr. 2009), LTE; Evolved Universal Terrestrial Radio Access (E-UTRA); Physical layer procedures, Release 8.

(Continued)

*Primary Examiner* — Kwang B Yao
*Assistant Examiner* — Nguyen Ngo
(74) *Attorney, Agent, or Firm* — Arent Fox LLP

(57) ABSTRACT

A method, an apparatus, and a computer program product for wireless communication are provided in which channel quality indicator (CQI) requirements for reporting a CQI are received, whether the CQI is to be reported periodically is determined based on the CQI requirements, and a wake-up time based on the determination is scheduled. CQI reporting requirements, such as CQI scheduling information may be used to plan a UE discontinuous reception (DRX) wake-up time and adaptively shorten a duration the UE is awake when transmission of a CQI report is not required at a first subframe of a DRX on-duration. The shorter UE awake duration results in reduced power consumption.

24 Claims, 11 Drawing Sheets

(56) References Cited

U.S. PATENT DOCUMENTS

| 2011/0216682 | A1* | 9/2011 | Xu et al. | 370/311 |
| 2013/0201892 | A1* | 8/2013 | Holma et al. | 370/311 |
| 2014/0254538 | A1* | 9/2014 | Park et al. | 370/329 |
| 2014/0376436 | A1* | 12/2014 | Kim et al. | 370/311 |

OTHER PUBLICATIONS

3GPP TS 36.300 v8.12.0 (Apr. 2010), LTE; Evolved Universal Terrestrial Radio Access (E-UTRA) and Evolved Universal Terrestrial Radio Access Network (E-UTRAN); Overall description; Stage 2, Release 8.

3GPP TS 36.304 v8.6.0 (Jul. 2009), LTE; Evolved Universal Terrestrial Radio Access (E-Utra); User Equipment (UE) procedures in idle mode, Release 8.

Ericsson: 3GPP TSG-RAN WG 2 Meeting #58, R2-071847, CQI Reporting with regards to DRX operation, Mobile Competence Centre, 650, Route Des Lucioles, F-06921 Sophia-Antipolis Cedex France, vol. RAN WG2, No. Kobe, Japan, May 4, 2007, pp. 1-2, XP050134742.

International Search Report and Written Opinion—PCT/US2012/069560—ISA/EPO—Mar. 19, 2013 (121145WO).

Nokia: 3GPP TSG-RAN WG 2 Meeting #57 R2-070470, CQI Reporting, Mobile Competence Centre 650, Route Des Lucioles, F-06921 Sophia-Antipolis Cedex, France, vol. RAN WG2, No. St. Louis, USA, Feb. 2, 2007, pp. 1-2, XP050133537.

Nokia Corporation et al., "3GPP TSG-RAN WG 2 Meeting #62bis, R2-083109, CQI Reporting Configuration," Mobile Competence Centre, 650, Route Des Lucioles, F-06921 Sophia-Antipolis Cedex, France, vol. RAN WG2, No. Warsaw, Poland, Jun. 23, 2008, p. 1, XP050140547.

\* cited by examiner

OPTIMIZING UE WAKEUP TIMELINE IN CONNECTED MODE DRX BASED ON CQI REPORTING SCHEDULE IN A WIRELESS COMMUNICATION SYSTEM

CROSS-REFERENCE TO RELATED APPLICATION(S)

This application claims the benefit of U.S. Provisional Application Ser. No. 61/592,526, entitled "OPTMIZING UE WAKEUP TIMELINE IN CONNECTED MODE DRX BASED ON CQI REPORTING SCHEDULE IN A WIRELESS COMMUNICATION SYSTEM" and filed on Jan. 30, 2012, which is expressly incorporated by reference herein in its entirety.

BACKGROUND

1. Field

The present disclosure relates generally to communication systems, and more particularly, to optimizing a user equipment wake-up time based on a channel quality indicator (CQI) reporting schedule.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A user equipment (UE) should be awake as little as possible in order to conserve battery life. In a discontinuous reception (DRX) mode, it is desirable for the UE to wake up as late as possible in order to monitor for downlink signals. However, the UE must consider waking early enough to monitor a downlink channel a given number of subframes before a first subframe within an on-duration in case a periodic CQI report is to be transmitted at the first subframe of the on-duration. However, if the CQI report is not scheduled to be transmitted at the first subframe of the on-duration, then the UE unnecessarily wakes an extra number of subframes prior to the first subframe of the on-duration. Accordingly, CQI reporting requirements, such as CQI scheduling information may be used to plan a UE DRX wake-up time and adaptively shorten a duration the UE is awake when transmission of the CQI report is not required during the first subframe of the DRX on-duration. The shorter UE awake duration results in reduced power consumption.

In an aspect of the disclosure, a method, an apparatus, and a computer program product for wireless communication are provided in which channel quality indicator (CQI) requirements for reporting a CQI are received, whether the CQI is to be reported periodically is determined based on the CQI requirements, and a wake-up time based on the determination is scheduled.

DETAILED DESCRIPTION

Figure 1:
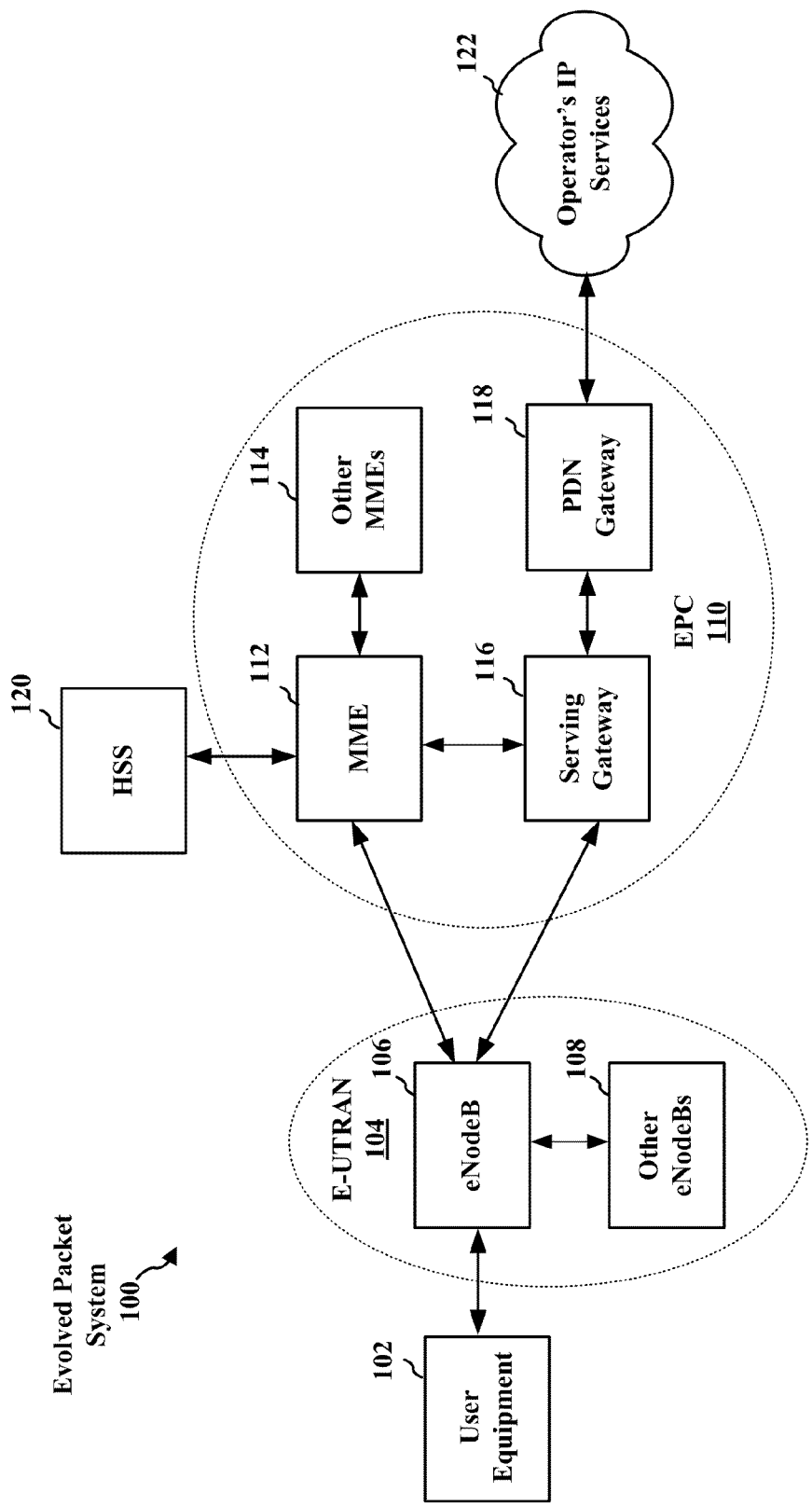
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
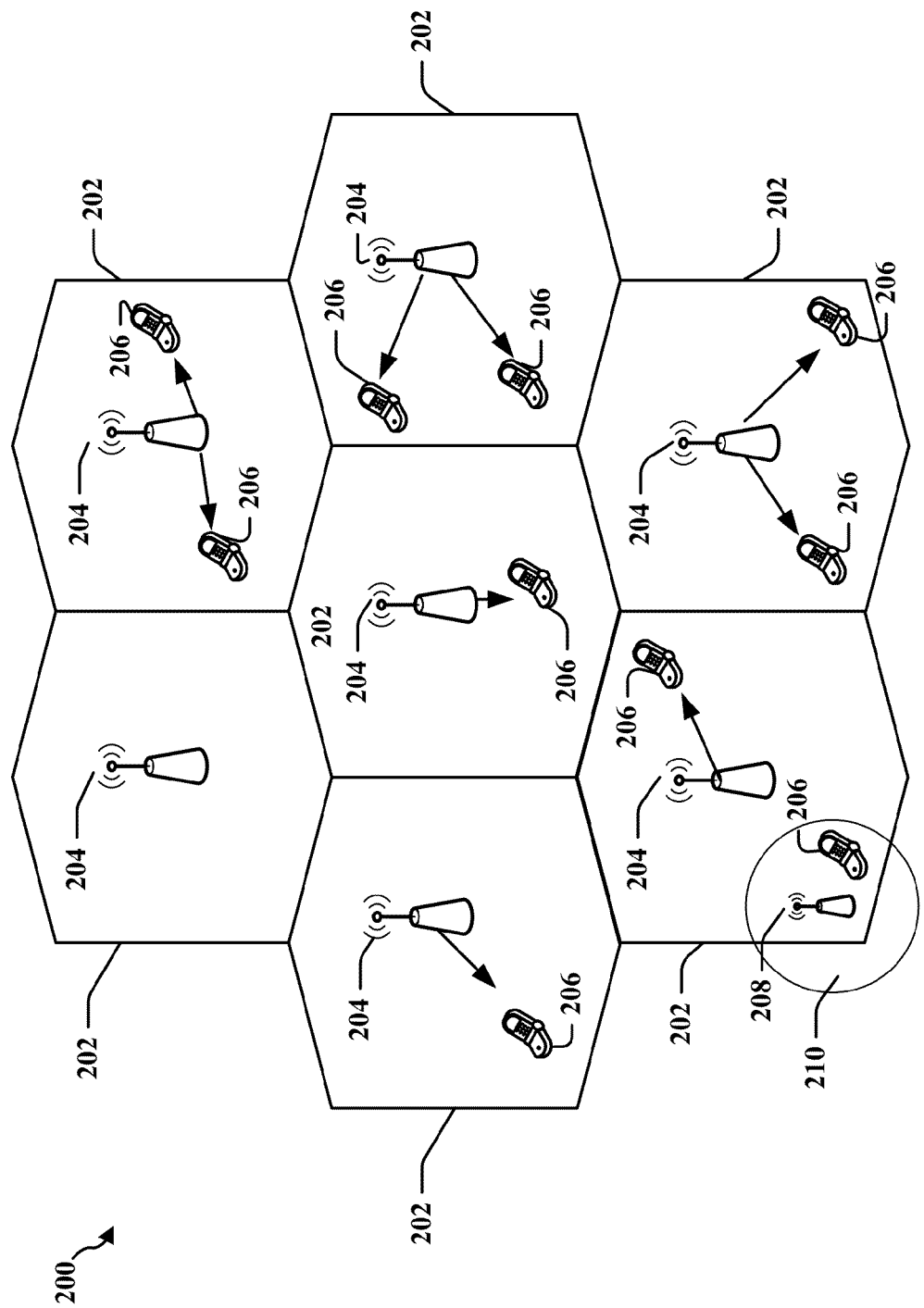
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
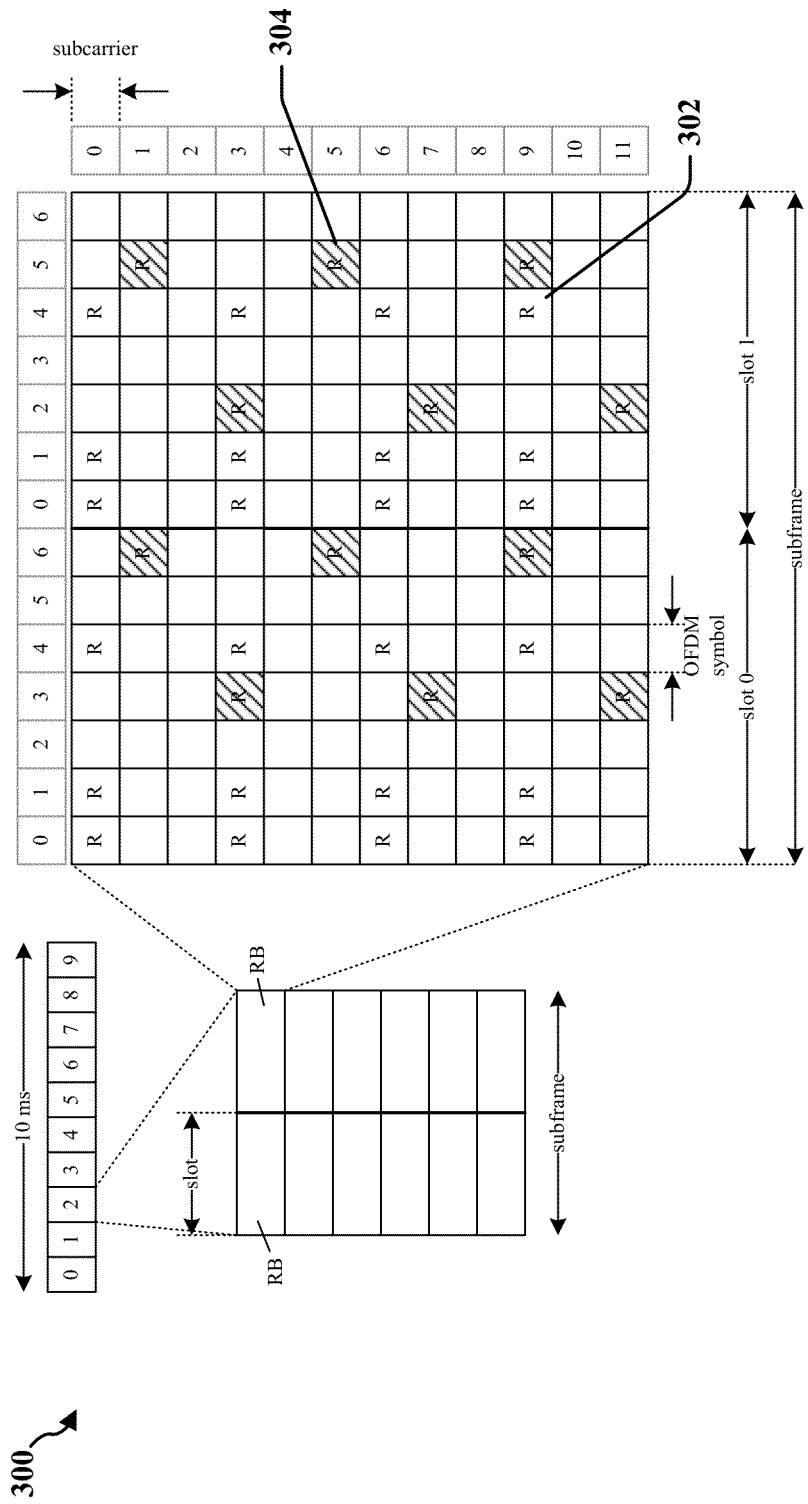
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
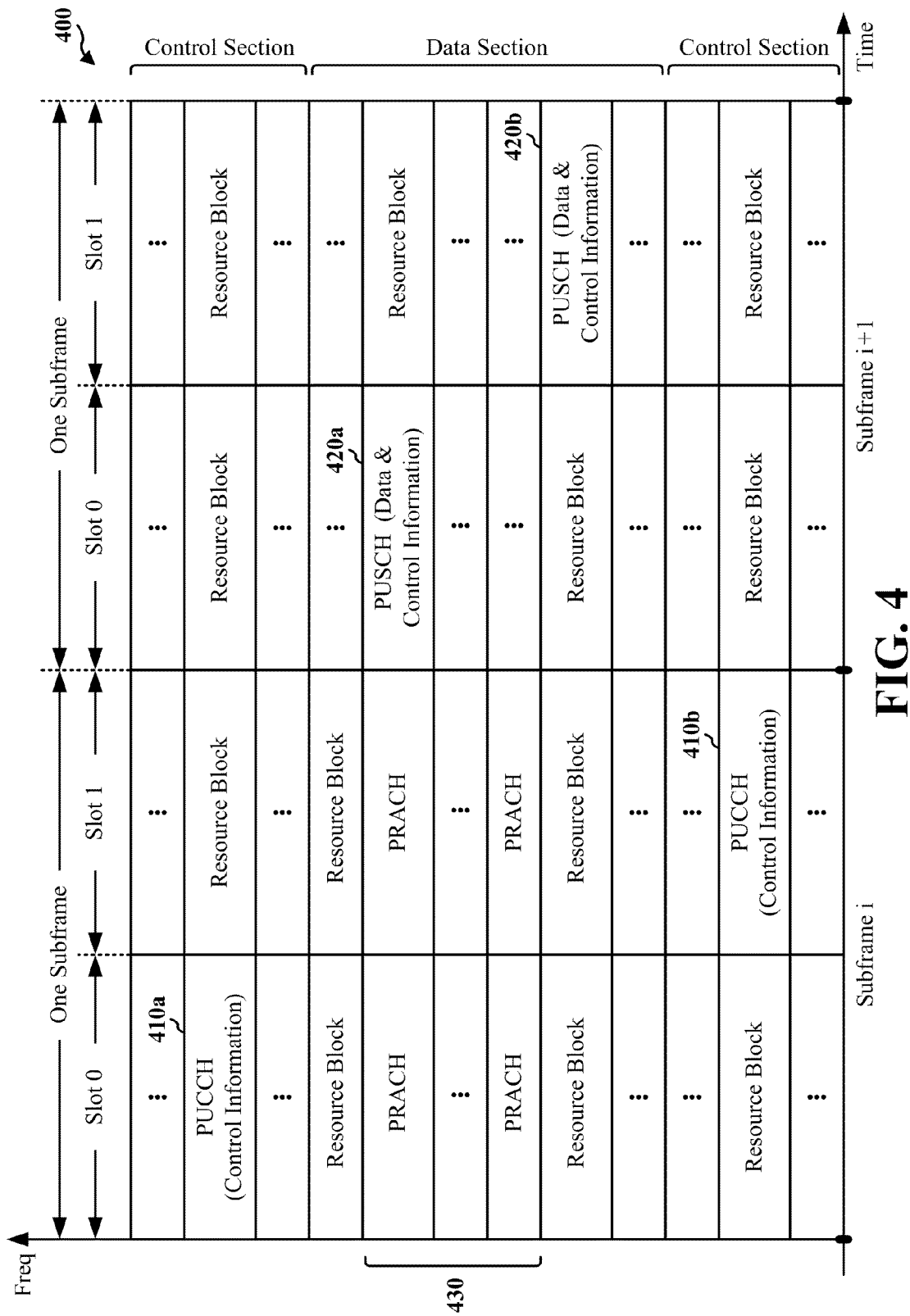
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
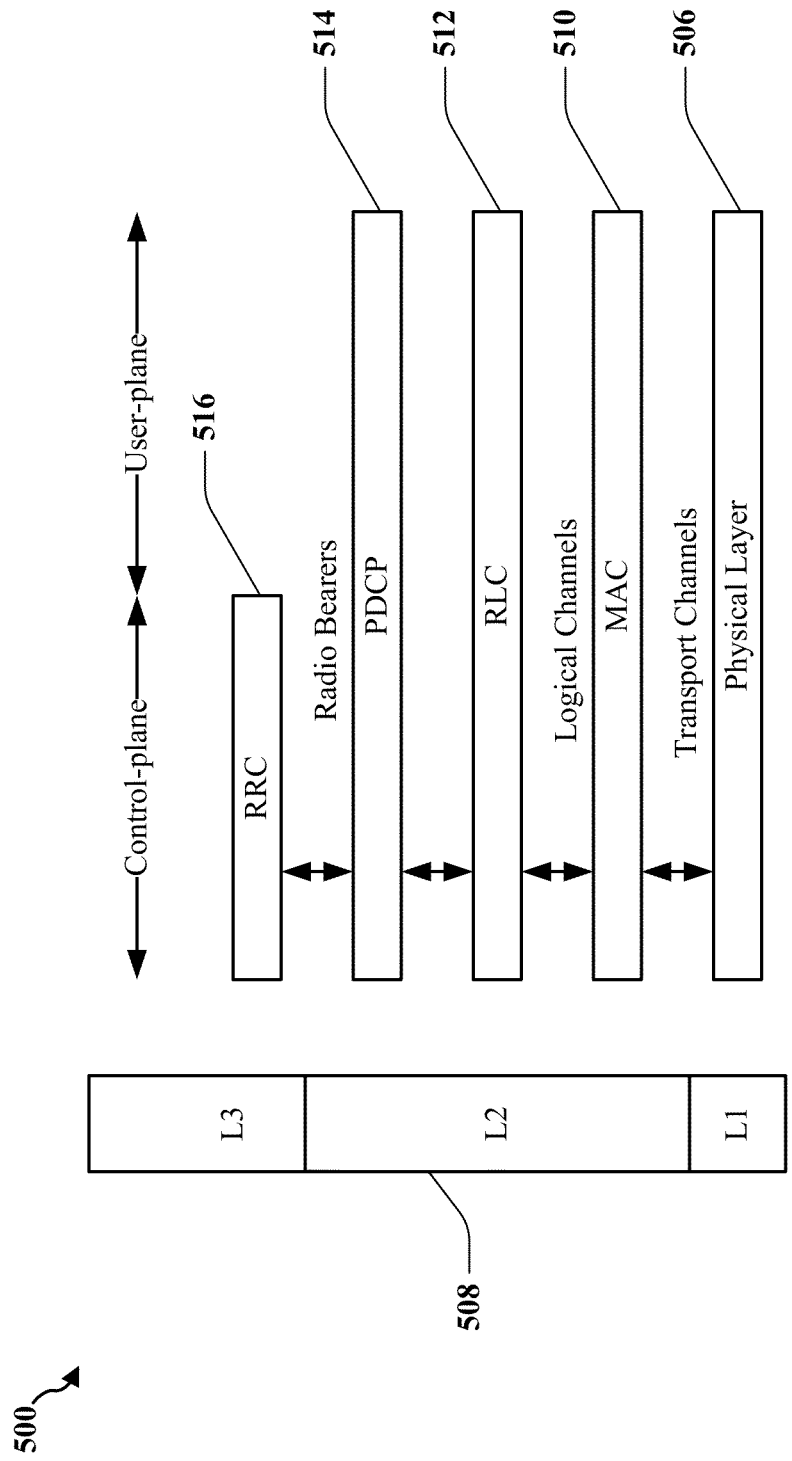
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
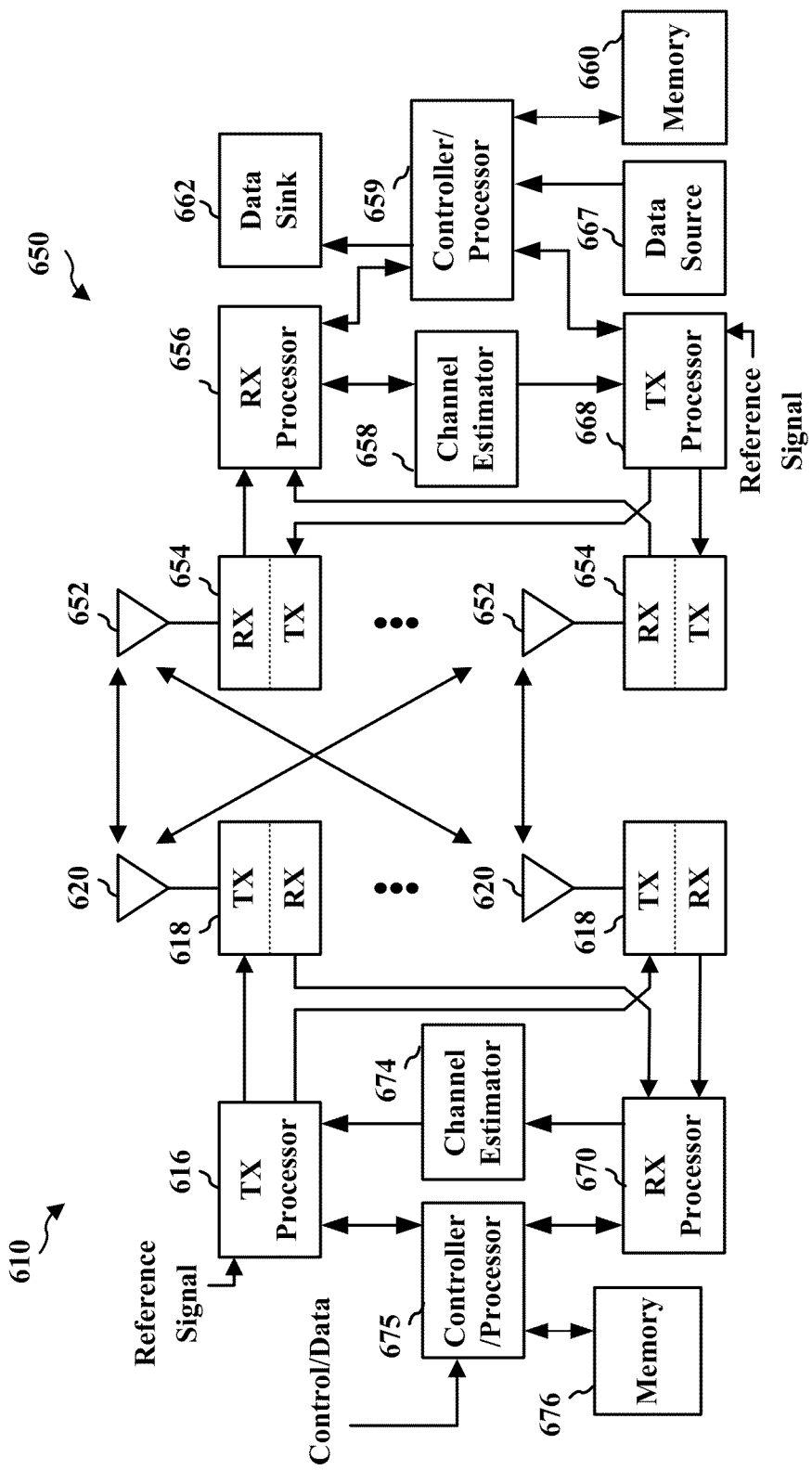
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
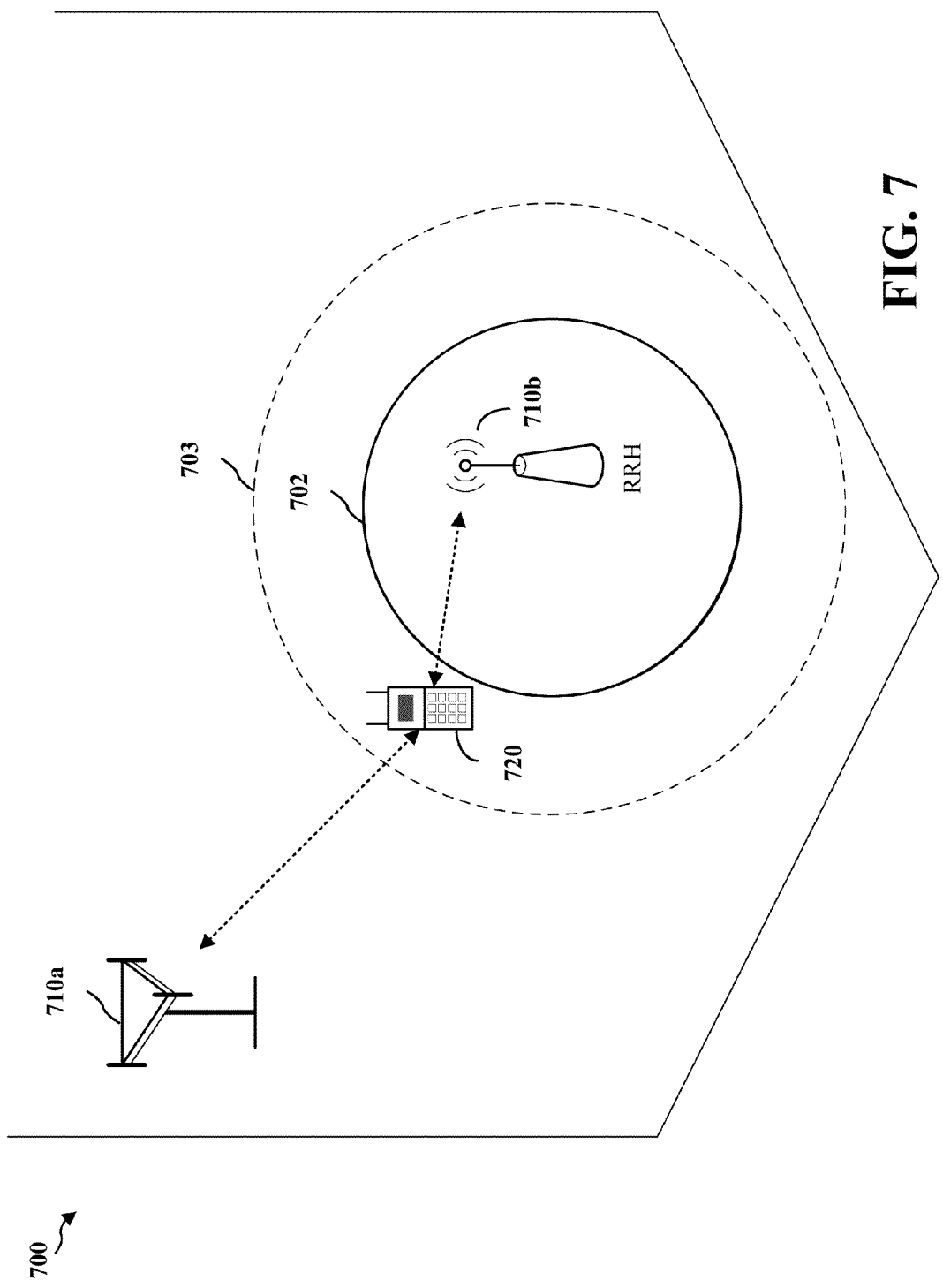
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In an aspect, LTE connected mode discontinuous reception (DRX) timelines may be optimized at the UE by considering differences in channel state information (CSI) configurations. Accordingly, UE power consumption may also be optimized.

The UE may be required to intermittently send CSI to the eNB to ensure proper closed loop operation between the UE and the network (NW). The CSI may include one or more of the following: 1) channel quality indicator (CQI); 2) precoding matrix indicator (PMI); and 3) rank indicator (RI). The PMI is applicable to closed loop spatial multiplexing modes. The RI is applicable to closed and open loop spatial multiplexing modes.

An example list of modulation schemes and code rates which can be signaled by means of a CQI value is shown in Table 1 below.

TABLE 1

| CQI Index | Modulation | Approximate code rate | Efficiency (information bits per symbol) |
|---|---|---|---|
| 0 | Out-of-range | — | — |
| 1 | QPSK | 0.076 | 0.1523 |
| 2 | QPSK | 0.12 | 0.2344 |
| 3 | QPSK | 0.19 | 0.3770 |
| 4 | QPSK | 0.3 | 0.6016 |
| 5 | QPSK | 0.44 | 0.8770 |
| 6 | QPSK | 0.59 | 1.1758 |
| 7 | 16QAM | 0.37 | 1.4766 |
| 8 | 16QAM | 0.48 | 1.9141 |
| 9 | 16QAM | 0.6 | 2.4063 |
| 10 | 64QAM | 0.45 | 2.7305 |
| 11 | 64QAM | 0.55 | 3.3223 |
| 12 | 64QAM | 0.65 | 3.9023 |
| 13 | 64QAM | 0.75 | 4.5234 |
| 14 | 64QAM | 0.85 | 5.1152 |
| 15 | 64QAM | 0.93 | 5.5547 |

Referring to Table 1, the CQI index is an index corresponding to a channel coding rate and a modulation scheme. The UE may be required to report the CQI as the highest index (i.e., the highest combination of code rate and modulation scheme), which when translated to a transport block size and modulation scheme and received on the DL PDSCH using a set of time/frequency reference resources, ensures a block error rate (BLER) of less than 10% based on a measured received signal quality.

CQI reporting may be configured to be periodic, aperiodic, or both by the eNB. For aperiodic CQI reporting, the UE is instructed by the eNB to send the CQI report at least four subframes prior to the subframe at which the UE is to send the CQI report. For periodic CQI reporting, the UE is semi-statically configured by higher layers to periodically feedback CQI reports. Both CQI reporting modes may be configured with a discontinuous reception (DRX) mechanism. In either case, the UE may measure downlink reception quality at a subframe, and send an uplink transmission of CQI based on the measurement at a time four milliseconds (4 ms) after the subframe at which the downlink reception quality was measured.

DRX is a mechanism for providing a balance between conserving power and maintaining continuous reception coverage at the UE. The DRX mechanism enables the UE to go to sleep at predetermined periodic intervals without losing reception coverage, thereby achieving significant savings in power consumption at a negligible cost of coverage.

DRX may be configured in both an idle mode and a connected mode. In idle mode DRX, the UE does not have a dedicated connection with the network, and waits to receive pages from the network for an incoming call, or waits for a user to make an outgoing call. The UE is allowed to sleep for a predetermined time and wakes up at specific intervals where it expects to receive pages. DRX configuration parameters including a duty cycle are cell-specific and carried over system information (SI) messages from the network. A UE-specific DRX configuration, which if signaled, may override the cell-specific configuration.

In connected mode DRX, the UE has a dedicated connection with the network. Based on certain triggers (e.g., UL/DL traffic activity, application type, etc.), the network may choose to configure a DRX duty cycle. The DRX duty cycle used in connected mode DRX may generally be shorter than the duty cycle used in idle mode DRX, but may be as long as the idle mode DRX duty cycle. The UE is allowed to sleep for a predetermined periodic interval and wakes up at specific intervals to demodulate a physical downlink control channel (PDCCH). Furthermore, in comparison to idle mode DRX, the connected mode DRX UE may be required to perform additional tasks upon waking, such as CSI feedback, uplink traffic transmission, etc.

When DRX is configured, periodic CQI reports may be sent by the UE during an "active-time." The RRC can further restrict periodic CQI reports so that they are only sent during an "on-duration." The on-duration is defined by a higher layer and is a minimum duration (in sub-frames or milliseconds) over which the UE is to monitor a downlink control channel every DRX cycle. The DRX cycle length is also defined by the higher layer. The active-time is a duration of time the UE monitors the downlink control channel and is usually equal to or longer than the on-duration. Accordingly, description herein may be limited to DRX on-duration as aspects described with respect to DRX on-duration also applies to DRX active-time.

To consume less battery power in DRX mode, the UE should be awake to process signals for as short a time as possible. Hence, the UE waking up as late as possible is desirable. However, the UE must wake early enough to monitor the downlink channel starting at the first subframe within the on-duration. Additionally, if a periodic CQI report is scheduled for transmission at the first subframe of the on-duration, the UE must wake to process downlink information x milliseconds/subframes prior to the first subframe of the on-duration, wherein x is a number of milliseconds/subframes required to generate a CQI report. For example, the value of x may be greater than or equal to 4.

In the above example, the UE must wake an extra x milliseconds before the start of the on-duration to account for a worst-case scenario where the periodic CQI report is scheduled for transmission at the first subframe of the on-duration. This extends the UE awake duration by an extra x milliseconds, which is only needed when the periodic CQI report is scheduled, and when the periodic CQI report is to be transmitted during the first subframe of the on-duration.

Accordingly, information regarding CQI reporting requirements, such as CQI scheduling information may be used to plan the UE DRX wake-up time and adaptively shorten the UE awake duration when transmission of the CQI report is not required during the first subframe of the DRX on-duration. This results in a shorter awake duration and improves a standby time for the UE due to a reduced standby current. The CQI reporting requirements may be received from the network via over-the-air (OTA) transmissions, downlink signaling, or reconfiguration messages, for example.

In an aspect, when DRX is configured in connected mode and the UE is ready to sleep at the end of the active-time, in preparation for a next wake-up, the UE may perform the following:

1) If periodic CQI reporting is not configured, then the UE schedules to wake to enable processing of downlink information at a first subframe of a next on-duration;
2) If periodic CQI reporting is configured, and y≥x, then the UE schedules to wake to enable processing of downlink information at the first sub-frame of the next on-duration; and
3) If periodic CQI reporting is configured, and y<x, the UE schedules to wake to enable processing of downlink information x−y subframes immediately before the start of the next on-duration, wherein x is a duration in subframes required to generate a CQI report and y is an offset between the first subframe of the on-duration and a subframe at which the periodic CQI report is to be transmitted.

Figure 8:
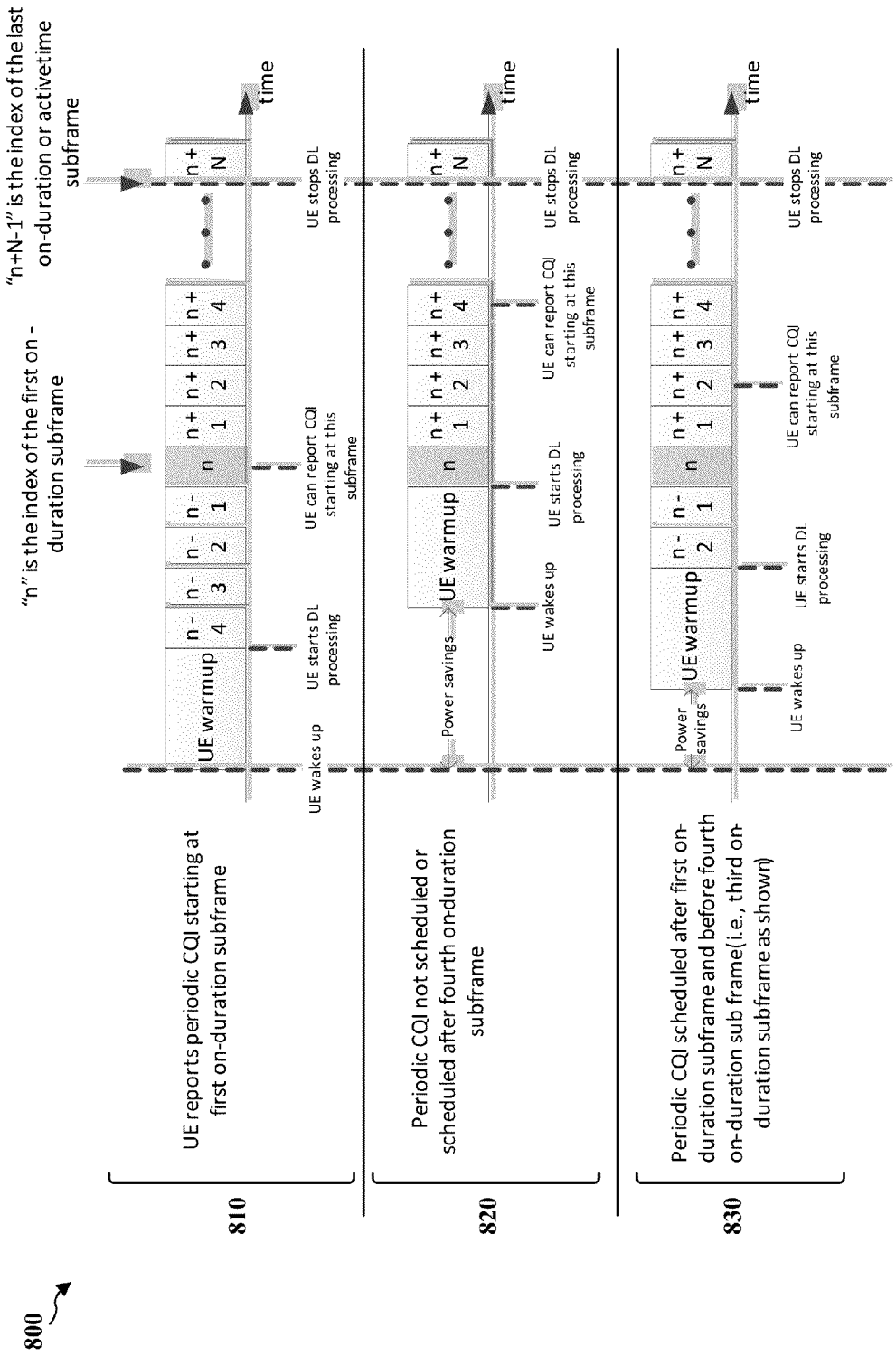
FIG. 8 is a diagram illustrating a UE wake-up timeline considering different CQI scheduling schemes.

FIG. 8 is a diagram 800 illustrating a UE wake-up timeline considering different CQI scheduling schemes. Referring to FIG. 8, "n" corresponds to the index of the first subframe of the on-duration and "n+N−1" corresponds to the index of the last subframe of the on-duration or active-time. As an example, a duration of four subframes is required in order to generate a CQI report. Moreover, information regarding a CQI reporting schedule may be received from the network by the UE.

In the CQI scheduling scheme depicted at 810, the UE is ready to periodically report CQI starting at the first subframe of the on-duration (subframe n). This scheme demonstrates the worst-case scenario described supra wherein the UE readies itself to transmit the CQI report at the start of the on-duration. Accordingly, the UE schedules to wake at a predetermined time, taking into account a warm-up duration, in order to begin processing downlink information at subframe n−4, which is four subframes prior to the first subframe of the on-duration. By beginning to process at subframe n−4, the UE can process downlink information for the required amount of time (e.g., four subframes) for generating the CQI report in order to send the CQI report starting at subframe n. At the last subframe of the on-duration or active-time, the UE ceases to process downlink information.

In the CQI scheduling scheme depicted at 820, the UE is aware that periodic CQI reporting is not required, or that the UE is scheduled to periodically report CQI at a subframe after a fourth subframe of the on-duration (subframe n+4 to subframe n+N−1). Accordingly, the UE schedules to wake at a predetermined time, taking into account a warm-up duration, in order to begin processing downlink information at subframe n, which is the first subframe of the on-duration. Notably, by beginning to process downlink information at the subframe n, the UE will at least have the required amount of time (e.g., four subframes) to generate the CQI report prior to sending the CQI report at any subframe between subframe n+4 and subframe n+N−1 if periodic CQI reporting is scheduled.

As shown in the scheduling scheme at 820, because the UE is aware that periodic CQI reporting is not scheduled or that periodic CQI reporting is scheduled at a subframe after a fourth subframe of the on-duration, the UE may wake later in time as compared to the CQI scheduling scheme depicted at 810. Thus, compared to the scheduling scheme at 810, the UE utilizing the scheduling scheme at 820 saves a considerable amount of power due to the UE knowing to wake later in time because of its knowledge of the CQI reporting schedule.

In the CQI scheduling scheme depicted at 830, the UE is aware of a schedule to periodically report CQI after the first subframe of the on-duration but before the fourth subframe of the on-duration. As shown at 830, the UE is scheduled to report CQI at the third subframe of the on-duration (subframe n+2), for example. Accordingly, the UE schedules to wake at a predetermined time, taking into account a warm-up duration, in order to begin processing downlink information at subframe n−2, which is two subframes prior to the first subframe of the on-duration. Notably, by beginning to process downlink information at the subframe n−2, the UE will have the required amount of time (e.g., four subframes) to generate the CQI report prior to sending the CQI report at subframe n+2.

In other words, referring to the scheduling scheme at 830, if periodic CQI reporting is configured, and y<x, wherein y=(n+2)−n=2 (offset between the first on-duration subframe and the subframe at which CQI is to be reported), and wherein x=4 (subframes required to generate CQI report), then the UE schedules to wake to enable processing of downlink information (x−y)=(4−2)=2 subframes immediately before the start of the on-duration. At 830, the subframe that is two subframes immediately before the start of the on-duration is subframe n−2.

Referring to 830 of FIG. 8, because the UE is aware that periodic CQI reporting is scheduled at the third subframe of the on-duration (subframe n+2), the UE may wake later in time as compared to the CQI scheduling scheme depicted at 810. Thus, compared to the scheduling scheme at 810, the UE utilizing the scheduling scheme at 830 also saves a considerable amount of power due to the UE knowing to wake later in time because of its awareness of the CQI reporting schedule.

Figure 9:
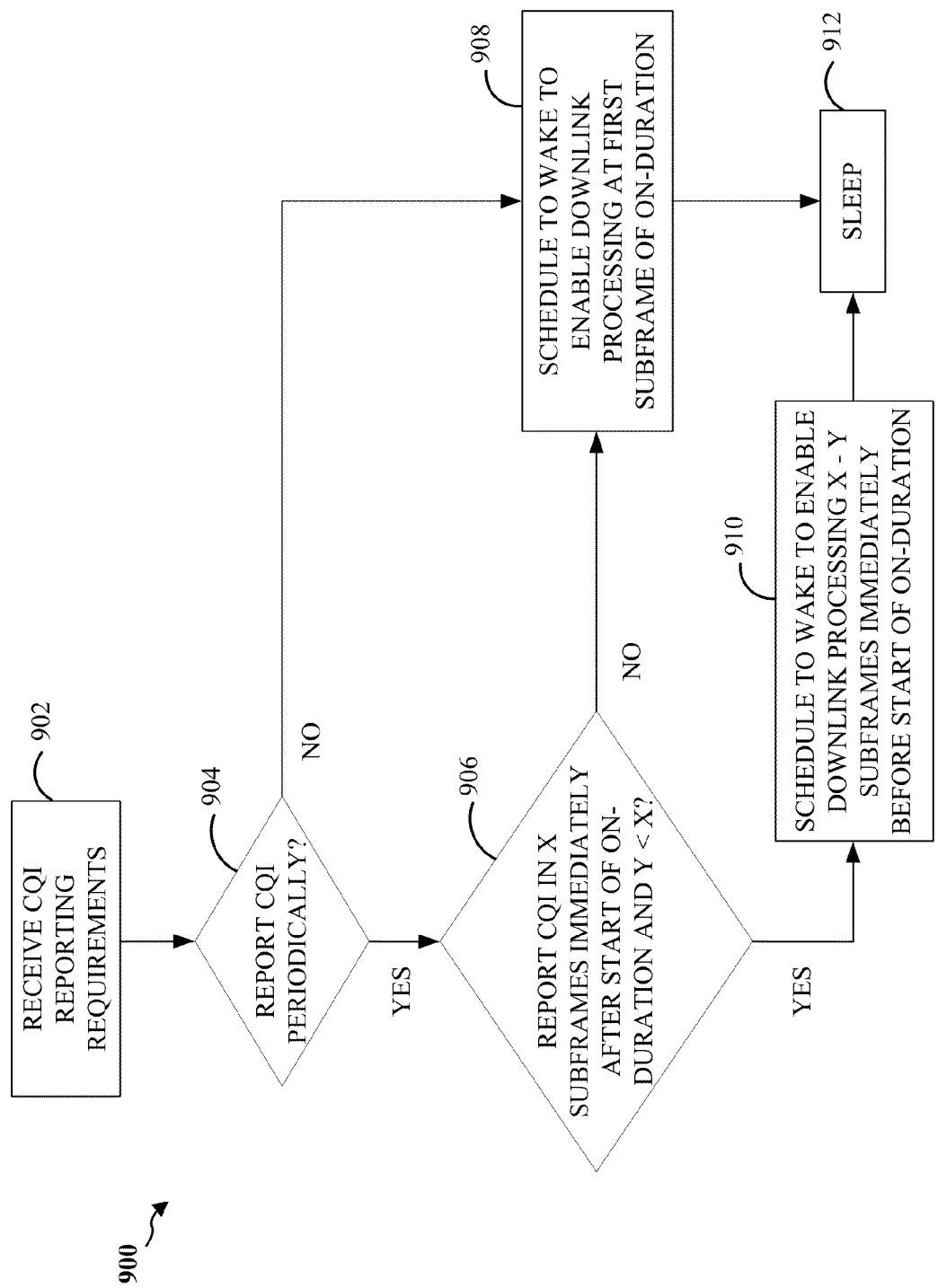
FIG. 9 is a flow chart of a method of wireless communication.

FIG. 9 is a flow chart 900 of a method of wireless communication. The method may be performed by a connected mode DRX UE that is near the end of an on-duration or active-time and preparing a next wake-up prior to going to sleep. In the method of FIG. 9, CQI reporting requirements are utilized by the UE to plan a DRX wake-up time and adaptively shorten an awake duration when transmission of CQI is not required at a first subframe of a DRX on-duration.

At step 902, the UE receives requirements for reporting CQI from the network. The CQI reporting requirements may include CQI scheduling information, which may be used by the UE to plan its wake-up time and shorten a duration the UE is required to be awake. The CQI reporting requirements may be received from the network via over-the-air (OTA) transmissions, downlink signaling, or reconfiguration messages, for example.

At step 904, the UE determines whether CQI is to be reported periodically based on the received CQI requirements. As stated supra, CQI reporting may be configured to be periodic or aperiodic. For periodic CQI reporting, the UE is semi-statically configured to periodically feedback a CQI report. For example, the UE may measure downlink reception quality at a subframe, and send an uplink transmission of CQI based on the measurement at a time four milliseconds (4 ms) after the subframe at which the downlink reception quality was measured. Here, the value of 4 ms may be included in the CQI requirements received from the network. If the UE determines that CQI is to be reported periodically, the UE proceeds to step 906. If the UE determines that CQI is not to be reported periodically, the UE proceeds to step 908.

At step 908, the UE schedules to wake to enable downlink processing at a first subframe of an on-duration when the CQI is determined not to be reported periodically. Enabling downlink processing may include measuring the downlink reception quality as stated above. Moreover, the on-duration may refer to a duration over which the UE monitors a downlink control channel every DRX cycle.

At step 906, the UE determines whether CQI is to be transmitted during any one of x subframes immediately following a start of the on-duration when the CQI is determined to be reported periodically. The UE also determines whether a value of y is less than a value of x. Here, the value of x refers to a number of subframes needed to generate a CQI report and the value of y refers to an offset between the first subframe of the on-duration and a subframe immediately following the start of the on-duration at which the CQI is to be transmitted. The values of x and y, and information identifying the subframe at which to report the CQI, may be included in the CQI requirements received from the network. If the UE determines that the CQI is not to be transmitted during any one of the x subframes immediately following the start of the on-duration and/or the value of y is not less than the value of x, then the UE proceeds to step 908 described above and schedules to wake to enable downlink processing at the first subframe of the on-duration. If the UE determines that the CQI is to be transmitted during any one of the x subframes immediately following the start of the on-duration and the value of y is less than the value of x, then the UE proceeds to step 910.

At step 910, the UE schedules to wake to enable processing of downlink information x−y subframes immediately before the start of the on-duration. By enabling downlink processing at a subframe that is x−y subframes immediately before the start of the on-duration, the UE wakes at the latest possible time to process downlink information while ensuring that the UE can process for the required amount of subframes for generating the CQI report. As stated above, the value of x is the number of subframes needed to generate the CQI report and the value of y is the offset between the first subframe of the on-duration and the subframe immediately following the start of the on-duration at which the CQI is to be reported. Referring to 830 of FIG. 8 as an example, the value of x (subframes required to generate CQI report) is equal to 4, and the value of y (offset between the first on-duration subframe and the subframe at which CQI is to be reported) is equal to (n+2)−n=2. Accordingly, the UE schedules to enable processing of downlink information (x−y)=(4−2)=2 subframes immediately before the start of the on-duration. As shown at 830 of FIG. 8, the subframe that is two subframes immediately before the start of the on-duration is subframe n−2. Thus, the UE schedules to wake to enable downlink processing at subframe n−2. At step 912, after the UE performs either of the operations at step 908 or step 910, the UE sleeps at the end of the on-duration or active-time.

Figure 10:
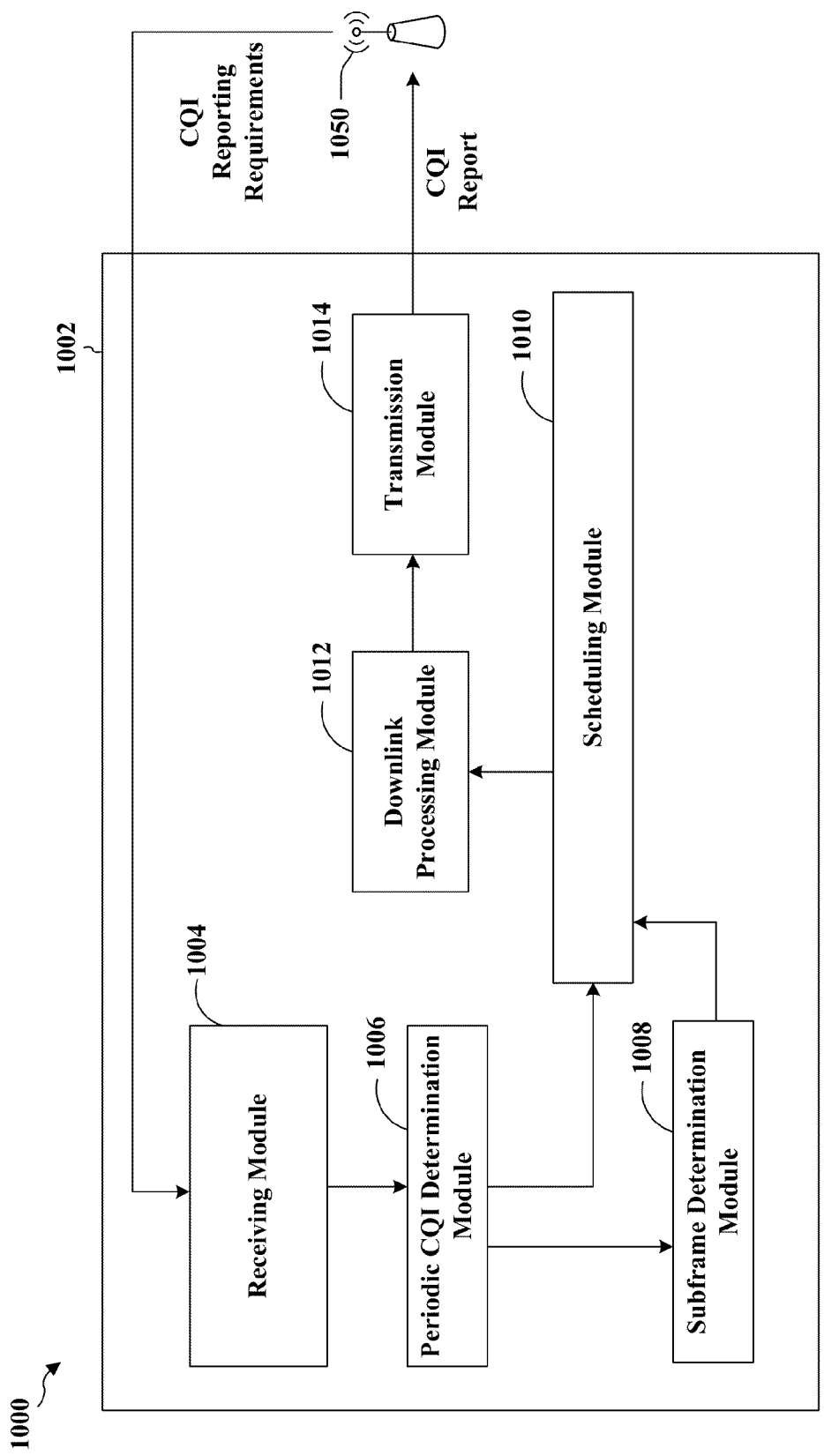
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus 1002 includes a receiving module 1004, a periodic CQI determination module 1006, a subframe determination module 1008, a scheduling module 1010, a downlink processing module 1012, and a transmission module 1014.

The receiving module 1004 receives requirements for reporting CQI from a network 1050. The CQI reporting requirements may include CQI scheduling information, which may be used by the apparatus 1002 to plan a wake-up time and shorten an awake duration. The CQI reporting requirements may be received from the network 1050 via over-the-air (OTA) transmissions, downlink signaling, or reconfiguration messages, for example.

Based on the CQI requirements received by the receiving module 1004, the periodic CQI determination module 1006 determines whether CQI is to be reported periodically. When the CQI determination module 1006 determines that CQI is not to be reported periodically, the scheduling module 1010 schedules the apparatus 1002 to wake to enable the downlink processing module 1012 to process downlink information (e.g., measure downlink reception quality) at a first subframe of an on-duration. The on-duration may refer to a duration over which the apparatus 1002 monitors a downlink control channel every DRX cycle.

When the CQI determination module 1006 determines that CQI is to be reported periodically, the subframe determination module 1008 determines whether CQI is to be transmitted during any one of x subframes immediately following a start of the on-duration. The subframe determination module 1008 also determines whether a value of y is less than a value of x, wherein the value of x is a number of subframes required to generate a CQI report and the value of y is an offset between the first subframe of the on-duration and a subframe immediately following the start of the on-duration at which the CQI is to be transmitted. The values of x and y, and information identifying the subframe at which to report the CQI, may be included in the CQI requirements received from the network 1050.

When the subframe determination module 1008 determines that the CQI is not to be transmitted during any one of the x subframes immediately following the start of the on-duration and/or the value of y is not less than the value of x, the scheduling module 1010 schedules to wake the apparatus 1002 to enable the downlink processing module 1012 to process downlink information at the first subframe of the on-duration. However, when the subframe determination module 1008 determines that the CQI is to be transmitted during any one of the x subframes immediately following the start of the on-duration and the value of y is less than the value of x, the scheduling module 1010 schedules to wake the apparatus 1002 to enable the downlink processing module 1012 to process downlink information x−y subframes immediately before the start of the on-duration.

By enabling downlink processing at a subframe that is x−y subframes immediately before the start of the on-duration, the apparatus 1002 wakes at the latest possible time to process downlink information while ensuring that the apparatus 1002 can process for the required amount of subframes for generating the CQI report. The value of x is the number of subframes needed to generate the CQI report and the value of y is the offset between the first subframe of the on-duration and the subframe immediately following the start of the on-duration at which the CQI is to be reported.

Upon processing the downlink information, the downlink processing module 1012 may further generate a CQI report. The CQI report may then be transmitted to the network 1050 via the transmission module 1014 at a scheduled subframe.

The apparatus may include additional modules that perform each of the steps of the algorithm in the aforementioned flow chart FIG. 9. As such, each step in the aforementioned flow chart FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
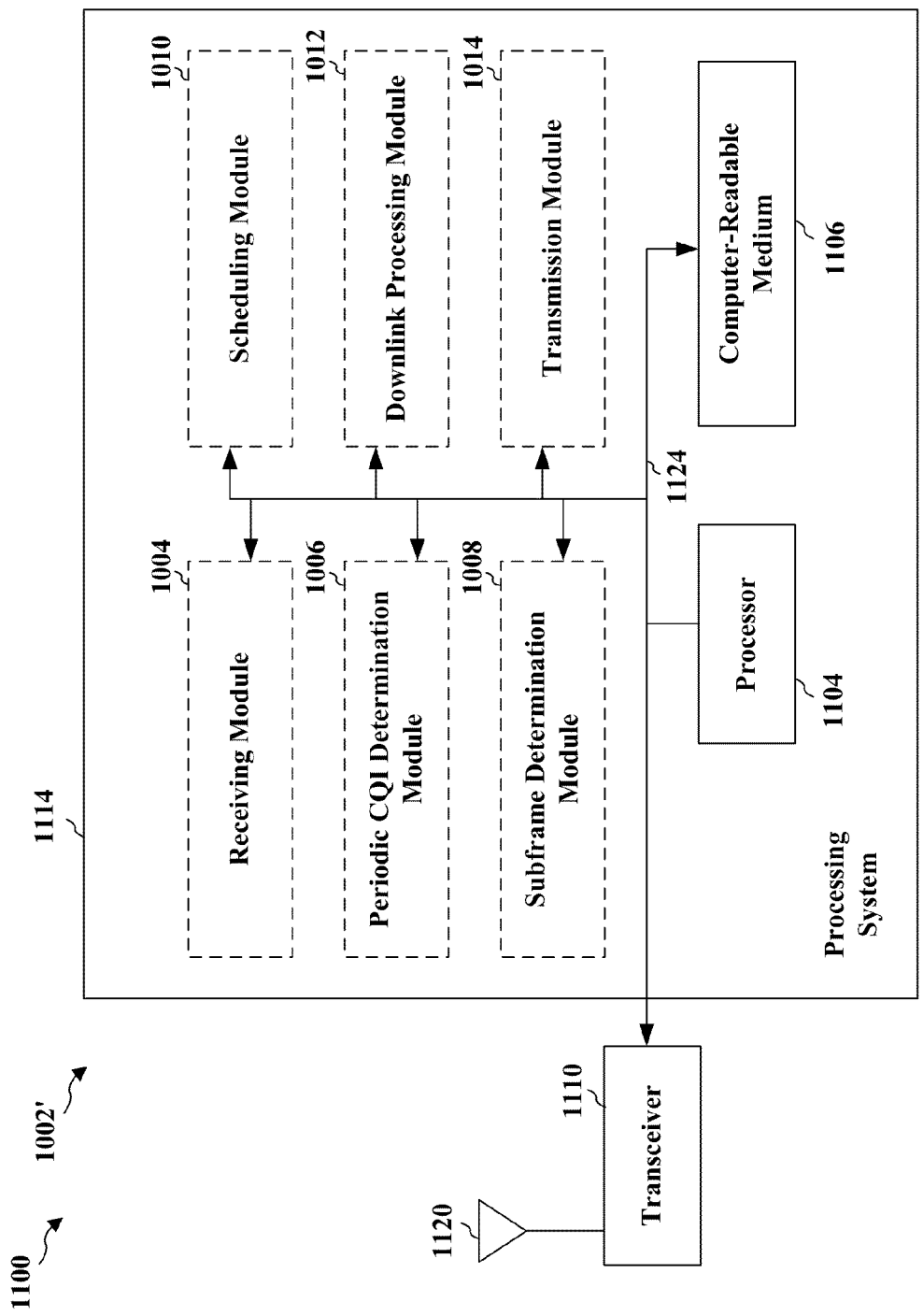
FIG. 11 is a diagram illustrating an example of a hardware implementation for an apparatus employing a processing system.

FIG. 11 is a diagram illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014 and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, 1012, and 1014. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for receiving channel quality indicator (CQI) requirements for reporting a CQI, means for determining whether the CQI is to be reported periodically based on the CQI requirements, and means for scheduling a wake-up time based on the determination. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving channel quality indicator (CQI) requirements for reporting a CQI;
   determining whether the CQI is to be reported periodically based on the CQI requirements; and
   scheduling, based on the determination, a wake-up time to enable processing of downlink information and transmission of the CQI,
   wherein the scheduling the wake-up time is further based on a number of subframes required to generate a CQI report and an offset between a first subframe of an on-duration and a subframe in which the CQI is determined to be transmitted, and
   wherein the wake-up time is scheduled prior to the first subframe of the on-duration when the number of subframes required to generate the CQI report is greater than the offset between the first subframe of the on-duration and the subframe in which the CQI is determined to be transmitted.

2. The method of claim 1, wherein the scheduling the wake-up time comprises:
   scheduling to wake to enable processing of the downlink information at the first subframe of the on-duration when the CQI is determined not to be reported periodically, wherein the on-duration is a duration over which a downlink control channel is monitored every discontinuous reception (DRX) cycle.

3. The method of claim 1, wherein the scheduling the wake-up time comprises:
   determining whether the CQI is to be transmitted during any one of x subframes immediately after a start of the on-duration when the CQI is determined to be reported periodically,
   wherein the on-duration is adoration over which a downlink control channel is monitored every discontinuous reception (DRX) cycle, and
   wherein x is a number of subframes required to generate a CQI report.

4. The method of claim 3, wherein the scheduling the wake-up time further comprises:
   scheduling to wake to enable processing of downlink information at a subframe that is x-y subframes immediately before the start of the on-duration when the CQI is determined to be transmitted during any one of the x subframes immediately after the start of the on-duration,
   wherein y is the offset between a first subframe of the on-duration and one of the x subframes at which the CQI is to be transmitted, and
   wherein y is less than x.

5. The method of claim 4, wherein the scheduling the wake-up time further comprises:

scheduling to wake to enable processing of downlink information at the first subframe of the on-duration when y is greater than or equal to x.

6. The method of claim 3, wherein the scheduling the wake-up time further comprises:
scheduling to wake to enable processing of downlink information at the first subframe of the on-duration when the CQI is determined not to be transmitted during any one of the x subframes immediately after the start of the on-duration.

7. An apparatus for wireless communication, comprising:
means for receiving channel quality indicator (CQI) requirements for reporting a CQI;
means for determining whether the CQI is to be reported periodically based on the CQI requirements; and
means for scheduling, based on the determination, a wake-up time to enable processing of downlink information and transmission of the CQI,
wherein the means for scheduling is configured to schedule the wake-up time based on a number of subframes required to generate a CQI report and an offset between a first subframe of an on-duration and a subframe in which the CQI is determined to be transmitted, and
wherein the wake-up time is scheduled prior to the first subframe of the on-duration when the number of subframes required to generate the CQI report is greater than the offset between the first subframe of the on-duration and the subframe in which the CQI is determined to be transmitted.

8. The apparatus of claim 7, wherein the means for scheduling the wake-up time is configured to:
schedule to wake to enable processing of the downlink information at the first subframe of the on-duration when the CQI is determined not to be reported periodically, wherein the on-duration is a duration over which a downlink control channel is monitored every discontinuous reception (DRX) cycle.

9. The apparatus of claim 7, wherein means for scheduling the wake-up time is configured Co:
determine whether the CQI is to be transmitted during any one of x subframes immediately after a start of the on-duration when the CQI is determined to be reported periodically,
wherein the on-duration is a duration over which a downlink control channel is monitored every discontinuous reception (DRX) cycle, and
wherein x is a number of subframes required to generate a CQI report.

10. The apparatus of claim 9, wherein the means for scheduling the wake-up time is further configured to:
schedule to wake to enable processing of downlink information at a subframe that is x-y subframes immediately before the start of the on-duration when the CQI is determined to be transmitted during any one of the x subframes immediately after the start of the on-duration,
wherein y is the offset between a first subframe of the on-duration and one of the x subframes at which the CQI is to be transmitted, and
wherein y is less than x.

11. The apparatus of claim 10, wherein the means for scheduling the wake-up time is further configured to:
schedule to wake to enable processing of downlink information at the first subframe of the on-duration when y is greater than or equal to x.

12. The apparatus of claim 9, wherein the means for scheduling the wake-up time is further configured to:
schedule to wake to enable processing of downlink information at the first subframe of the on-duration when the CQI is determined not to be transmitted during any one of the x subframes immediately after the start of the on-duration.

13. An apparatus for wireless communication, comprising:
a memory; and
at least one processor coupled to the memory and configured to:
receive channel quality indicator (CQI) requirements for reporting a CQI;
determine whether the CQI is to be reported periodically' based on the CQI requirements; and
schedule, based on the determination, a wake-up time to enable processing of downlink information and transmission of the CQI,
wherein the at least one processor is configured to schedule the wake-up time further based on a number of subframes required to generate a CQI report and an offset between a first subframe of an on-duration and a subframe in which the CQI is determined to be transmitted, and
wherein the wake-up time is scheduled prior to the first subframe of the on-duration when the number of subframes required to generate the CQI report is greater than the offset between the first subframe of the on-duration and the subframe in which the CQI is determined to be transmitted.

14. The apparatus of claim 13, wherein the at least one processor coupled to the memory is further configured to:
schedule to wake to enable processing of the downlink information at the first subframe of the on-duration when the CQI is determined not to be reported periodically, wherein the on-duration is a duration over which a downlink control channel is monitored every discontinuous reception (DRX) cycle.

15. The apparatus of claim 13, wherein the at least one processor coupled to the memory is further configured to:
determine whether the CQI is to be transmitted during any one of x subframes immediately after a start of the on-duration when the CQI is determined to be reported periodically,
wherein the on-duration is a duration over which a downlink control channel is monitored every discontinuous reception (DRX) cycle, and
wherein x is a number of subframes required to generate a CQI report.

16. The apparatus of claim 15, wherein the at least one processor coupled to the memory is further configured to:
schedule to wake to enable processing of downlink information at a subframe that is x-y subframes immediately before the start of the on-duration when the CQI is determined to be transmitted during any one of the x subframes immediately after the start of the on-duration,
wherein y is the offset between a first subframe of the on-duration and one of the x subframes at which the CQI is to be transmitted, and
wherein y is less than x.

17. The apparatus of claim 16, wherein the at least one processor coupled to the memory is further configured to:
schedule to wake to enable processing of downlink information at the first subframe of the on-duration when y is greater than or equal to x.

18. The apparatus of claim 15, wherein the at least one processor coupled to the memory is further configured to:
schedule to wake to enable processing of downlink information at the first subframe of the on-duration when the CQI is determined not to be transmitted during any one of the x subframes immediately after the start of the on-duration.

19. A non-transitory computer-readable medium storing code that when executed on at least one processor causes the at least one processor to:
  receive channel quality indicator (CQI) requirements for reporting a CQI;
  determine whether the CQI is to be reported periodically based on the CQI requirements; and
  schedule, based on the determination, a wake-up time to enable processing of downlink information and transmission of the CQI,
    wherein the code for scheduling the wake-up time is configured to schedule the wakeup time further based on a number of subframes required to generate a CQI report and an offset between a first subframe of an on-duration and a subframe in which the CQI is determined to be transmitted, and
    wherein the wake-up time is scheduled prior to the first subframe of the on-duration when the number of subframes required to generate the CQI report is greater than the offset between the first subframe of the on-duration and the subframe in which the CQI is determined to be transmitted.

20. The non-transitory computer-readable medium of claim 19, wherein the code for scheduling the wake-up time is configured to:
  schedule to wake to enable processing of the downlink information at the first subframe of the on-duration when the CQI is determined not to be reported periodically, wherein the on-duration is a duration over which a downlink control channel is monitored every discontinuous reception (DRX) cycle.

21. The non-transitory computer-readable medium of claim 19, wherein the code for scheduling the wake-up time is configured to:
  determine whether the CQI is to be transmitted during any one of x subframes immediately after a start of the on-duration when the CQI is determined to be reported periodically,
  wherein the on-duration is adoration over which a downlink control channel is monitored every discontinuous reception (DRX) cycle, and
  wherein x is a number of subframes required to generate a CQI report.

22. The non-transitory computer-readable medium of claim 21, wherein the code for scheduling the wake-up time is further configured to:
  schedule to wake to enable processing of downlink information at a subframe that is x-y subframes immediately before the start of the on-duration when the CQI is determined to be transmitted during any one of the x subframes immediately after the start of the on-duration,
  wherein y is the offset between a first subframe of the on-duration and one of the x subframes at which the CQI is to be transmitted, and
  wherein y is less than x.

23. The non-transitory computer-readable medium of claim 22, wherein the code for scheduling the wake-up time is further configured to:
  schedule to wake to enable processing of downlink information at the first subframe of the on-duration when y is greater than or equal to x.

24. The non-transitory computer-readable medium of claim 21, wherein the code for scheduling the wake-up time is further configured to:
  schedule to wake to enable processing of downlink information at the first subframe of the on-duration when the CQI is determined not to be transmitted during any one of the x subframes immediately after the start of the on-duration.

* * * * *